(12) United States Patent
Dole et al.

(10) Patent No.: US 7,818,869 B2
(45) Date of Patent: Oct. 26, 2010

(54) METHOD OF USING A COUPLING HAVING AN ANGULARLY ORIENTED CAVITY

(75) Inventors: Douglas R. Dole, Whitehouse Station, NJ (US); Michael V. Porter, Easton, PA (US); Scott D. Madara, Nazareth, PA (US); William A. Nagle, Laureldale, PA (US); John W. Pierce, Nazareth, PA (US); William M. McPoyle, Bethlehem, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 12/756,391

(22) Filed: Apr. 8, 2010

(65) Prior Publication Data

US 2010/0194109 A1    Aug. 5, 2010

Related U.S. Application Data

(62) Division of application No. 11/553,012, filed on Oct. 26, 2006, now Pat. No. 7,722,087.

(60) Provisional application No. 60/730,305, filed on Oct. 26, 2005.

(51) Int. Cl.
*B23P 11/00* (2006.01)
*F16L 25/04* (2006.01)

(52) U.S. Cl. .................... 29/525.02; 285/420

(58) Field of Classification Search ............. 29/525.02, 29/525.01, 428, 272, 263, 235, 282, 33 T; 285/420, 112, 373, 419, 368, 363
See application file for complete search history.

(56) References Cited

U.S. PATENT DOCUMENTS

| | | | |
|---|---|---|---|
| 4,471,979 A * | 9/1984 | Gibb et al. | ............ 285/373 |
| 4,611,839 A | 9/1986 | Rung et al. | |
| 4,639,020 A | 1/1987 | Rung et al. | |
| 4,861,075 A | 8/1989 | Pepi et al. | |
| 4,896,902 A | 1/1990 | Weston | |

(Continued)

FOREIGN PATENT DOCUMENTS

EP     0 361 765     4/1990

(Continued)

OTHER PUBLICATIONS

PCTUS/06/41625, filed Apr. 2008, ISR/Written Opinion.

*Primary Examiner*—John C Hong
(74) *Attorney, Agent, or Firm*—Ballard Spahr LLP

(57) ABSTRACT

A method for joining pipe elements in end to end relation uses a coupling that includes interconnectable coupling segments having connection members at opposite ends. The connection members are tightenable for drawing the segments toward one another and into engagement with the pipe elements. Each segment has a concavity positioned between inwardly projecting arcuate surfaces that engage grooves in the pipe elements. The concavities house a sealing member that extends circumferentially around the pipe elements. Angularly oriented surfaces are positioned adjacent to the connection members. The surfaces on facing segments engage one another and cause the segments to rotate in opposite directions about an axis perpendicular to the pipe elements. The concavities are angularly oriented with respect to the axis so that when the segments rotate, the concavities are oriented substantially parallel to the seal.

10 Claims, 3 Drawing Sheets

U.S. PATENT DOCUMENTS

| | | |
|---|---|---|
| 4,966,395 A | 10/1990 | Hendrickson |
| 5,018,548 A | 5/1991 | McLennan |
| 5,246,257 A | 9/1993 | Kojima et al. |
| 5,758,907 A * | 6/1998 | Dole et al. .................. 285/112 |
| 6,076,861 A | 6/2000 | Ikeda |
| 6,227,577 B1 | 5/2001 | Ikeda et al. |
| 6,626,466 B1 | 9/2003 | Dole |
| 7,086,131 B2 | 8/2006 | Gibb et al. |
| 7,090,259 B2 | 8/2006 | Dole |

FOREIGN PATENT DOCUMENTS

| | | |
|---|---|---|
| EP | 06 85 1453 | 12/2008 |
| EP | 09162246.4-2424 | 10/2009 |
| GB | 1143597 | 2/1969 |

* cited by examiner

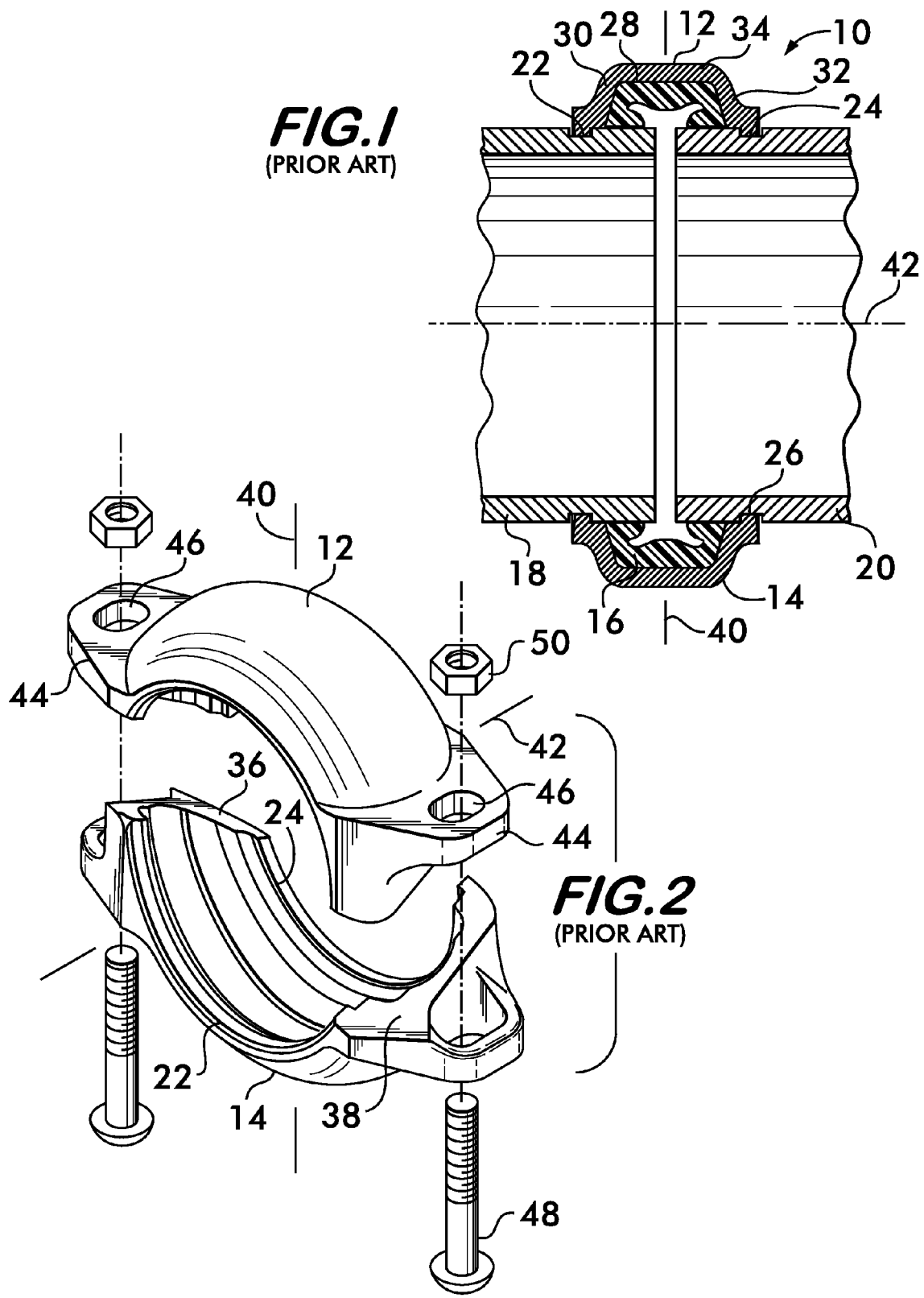

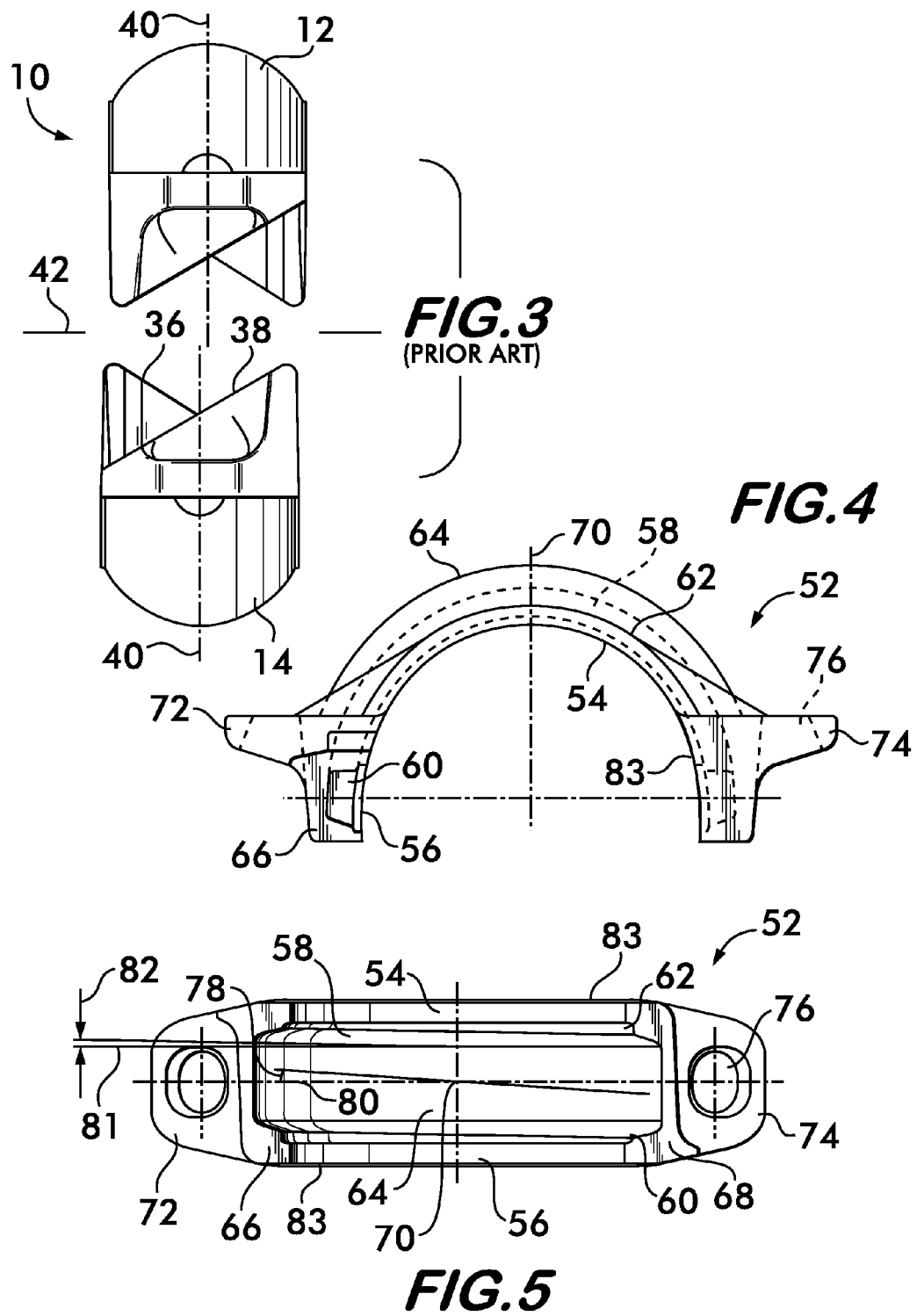

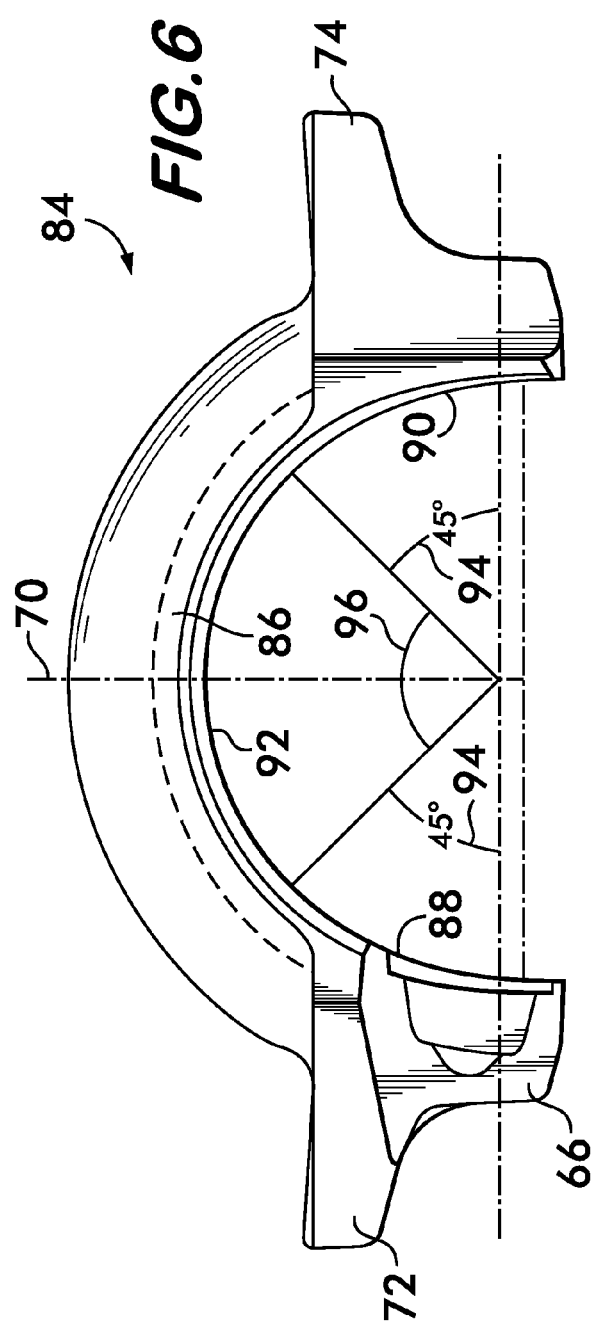
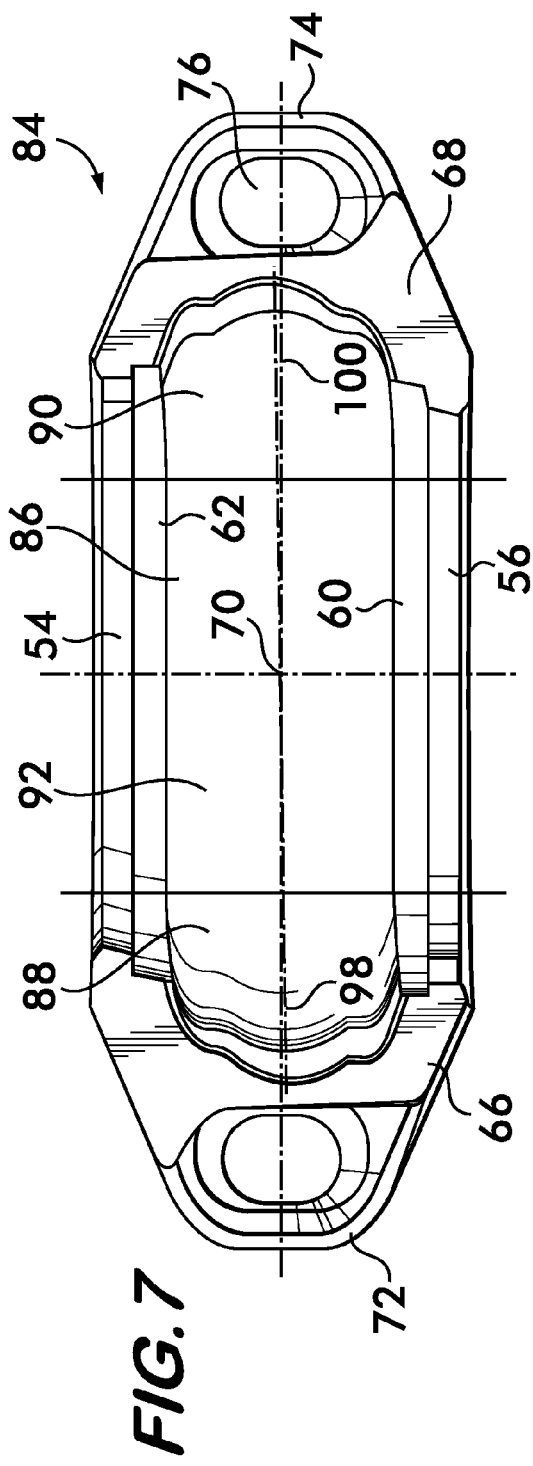

METHOD OF USING A COUPLING HAVING AN ANGULARLY ORIENTED CAVITY

CROSS-REFERENCE TO RELATED APPLICATIONS

This application is based upon and claims priority to application Ser. No. 11/553,012 filed Oct. 26, 2006, which claims priority to U.S. Provisional Application No. 60/730,305, filed Oct. 26, 2005.

FIELD OF THE INVENTION

This invention relates to a method of using a mechanical coupling for joining pipe elements together in end-to-end relation.

BACKGROUND OF THE INVENTION

Mechanical pipe couplings are used throughout a broad spectrum of industry, for example, in mining, petroleum extraction and refining, chemical production as well as in fire protection systems used in office buildings, warehouses, schools and the like. Mechanical couplings provide significant advantages over other methods of joining pipe elements together, for example, welding or brazing, in that they allow for the assembly of a fluid carrying piping network by relatively unskilled labor using simple tools. The term "pipe elements" is used herein to denote any pipe-like item or component having a pipe-like form. Pipe elements include pipe stock, pipe fittings such as elbows, caps and tees as well as fluid control components such as valves, reducers, strainers, restrictors, pressure regulators and the like.

FIG. 1 shows an example of a mechanical pipe coupling 10 according to the prior art. Coupling 10 comprises two (or more) segments 12 and 14 that are positionable straddling a sealing member 16 and pipe elements 18 and 20. Each coupling segment 12 and 14 has arcuate surfaces 22 and 24 that respectively engage the pipe elements 18 and 20 to secure them in end to end relation. In the example shown in FIG. 1, the arcuate surfaces 22 project radially inwardly and engage grooves 26 in the ends of the pipe elements. Other examples include pipe elements having smooth ends, flared ends or raised shoulders that are engaged by the couplings.

The sealing member 16 engages both pipe elements 18 and 20 and ensures a fluid-tight joint. Sealing member 16 is preferably a flexible elastomeric ring that is positioned within a cavity 28 within the coupling defined by a pair of sidewalls 30 and 32 attached to a back wall 34. Sealing member 16 is compressed into engagement with the pipe elements by contact with the sidewalls and back wall of the coupling segments 12 and 14 as the segments are drawn together to form the pipe joint.

As shown in FIGS. 2 and 3, coupling segments 12 and 14 may have angularly oriented surfaces 36 and 38 positioned at opposite ends. The slopes of the surfaces are oriented opposite to one another on each segment. When the surfaces on two segments are positioned in facing relation, as when the segments are straddling pipe elements 18 and 20, and the segments are drawn together, sliding engagement of the surfaces causes the segments to rotate in opposite directions relatively to one another about an axis 40 that is oriented substantially perpendicular to the longitudinal axis 42 of pipe elements 16 and 18. The relative rotation of the segments 12 and 14 is desirable because it forces the arcuate surfaces 22 and 24 into engagement with the side surfaces of grooves 26 in the pipe elements and adds rigidity to the joint about all axes, i.e., bending and torsion, as well as preventing axial expansion or contraction.

In addition to the angularly oriented surfaces described herein, there are other means for effecting relative rotation of the coupling segments, such as the crescent shaped protrusion interfitting within the crescent shaped groove as disclosed in U.S. Pat. No. 5,246,257, hereby incorporated by reference, or the use of offset apertures in attachment flanges as disclosed in U.S. Pat. No. 4,861,075, also hereby incorporated by reference.

To connect segments 12 and 14, each segment has connection members positioned at opposite ends of the segments. In the example illustrated in FIGS. 2 and 3, the connection members comprise projections 44 in the form of lugs that extend outwardly from the segments. The projections have apertures 46 that receive fasteners such as bolts 48 and nuts 50 which, when tightened, cause the segments 12 and 14 to be drawn toward one another.

While it is advantageous in certain circumstances to increase the rigidity of the joint by rotating the coupling segments about axis 40, this rotation of the segments deforms the sealing member 16 through its engagement with the sidewalls 30 and 32. It is preferable not to distort the shape of the sealing member through rotation of the segments.

SUMMARY OF THE INVENTION

The invention concerns a method of securing facing end portions of pipe elements together in end-to-end relationship. The method uses a pipe coupling having a pair of coupling segments attached to one another end-to-end. Each of the coupling segments has a concavity extending along an inner circumference. The concavities are oriented angularly about a first axis oriented perpendicularly to a second axis extending between ends of the coupling segments. A seal is positioned within the concavities. The seal defines a plane containing the first and second axes.

The method comprises:
 (a) positioning the end portions of the pipe elements between the segments;
 (b) drawing the coupling segments toward one another and the pipe elements; and
 (c) rotating the coupling segments about the first axis relatively to the seal, thereby orienting the concavities substantially parallel to the seal.

The segments may be rotated in opposite directions to each other. Positioning of the end portions may comprises inserting end portions of the pipe elements between the segments when the segments are connected to one another end to end in spaced apart relation. Drawing the coupling segments may be effected by tightening connection members positioned at the ends of the coupling segments. Rotating the coupling segments is effected by bringing angularly oriented surfaces positioned at the ends of the coupling segments into sliding contact with one another.

BRIEF DESCRIPTION OF THE DRAWINGS

FIG. 1 is a longitudinal sectional view of a pipe joint using a pipe coupling according to the prior art;

FIG. 2 is an exploded perspective view of a pipe coupling according to the prior art;

FIG. 3 is an exploded side view of the pipe coupling shown in FIG. 2;

FIG. 4 is a front view of a pipe coupling segment according to the invention;

FIG. 5 is a bottom view of the pipe coupling segment shown in FIG. 4;

FIG. 6 is a front view of another embodiment of a pipe coupling segment according to the invention; and FIG. 7 is a bottom view of the pipe coupling segment shown in FIG. 6.

DETAILED DESCRIPTION OF THE EMBODIMENTS

FIGS. 4 and 5 show a pipe coupling segment 52 according to the invention. Segment 52 has arcuate surfaces 54 and 56 adapted to interface with the outer surfaces of pipe elements. A cavity 58 is positioned between the arcuate surfaces. The cavity is defined by sidewalls 60 and 62 and a back wall 64 attached to the sidewalls. Angularly oriented surfaces 66 and 68 are positioned at each end of the coupling segment. The surfaces 66 and 68 have opposite slopes, and when they engage similar surfaces on another segment in facing relation they cause the coupling segments to rotate in opposite directions relatively to one another about an axis 70 that is substantially perpendicular to the longitudinal axis of the pipe elements being joined by the coupling. Connection members 72 and 74 are positioned at opposite ends of the coupling segment 52. In this example the connection members comprise lugs having apertures 76 adapted to receive fasteners such as bolts and nuts for connection of two coupling segments together straddling pipe elements.

In the embodiment shown in FIGS. 4 and 5, cavity 58 has an angular orientation with an orientation angle 78 measured about the rotation axis 70 relative to a datum line 80 that extends between the connection members 70 and 72. The orientation angle 78 of cavity 58 is defined by the angle 82 of the sidewalls 60 and 62 relative to a line 81 parallel to the datum line 80. Orientation angle 78 is preferably less than 4° for practical designs, and may range between ¼° and 4° depending upon the coupling size and degree of rotation of the coupling segments. The orientation angle 78 is oriented in a direction opposite to that of the direction of relative rotation of the coupling segment 52 when engaged with another coupling segment. This arrangement of the orientation angle compensates for the rotation of the coupling segment so that the sealing member, which is substantially perpendicular to the longitudinal axis of the pipe elements (i.e., aligned with datum line 80), is not distorted by interaction with the sidewalls 60 and 62 and back wall 64 when the coupling segment rotates about axis 70. Cavity 58 is, thus, angled so that, despite the fact that the coupling segments rotate relative to the pipe elements and the sealing member, the sealing member is received substantially squarely within the cavity and is not distorted by forced contact with one of the sidewalls as a result of the rotation.

When coupling segments 52 are attached to one another surrounding a sealing member and pipe elements in a manner similar to that shown in FIGS. 1 and 2, they will be initially skewed in opposite directions due to the sidewalls of the cavities engaging the sealing member, the cavities being angularly oriented as described above. As the segments are brought towards the pipe elements, the arcuate surfaces 54 and 56 may not initially align with the grooves in the pipe elements due to the initial skew of the segments. As a result, the arcuate surfaces may not properly engage the grooves. To lessen the chance of such misalignment, it is advantageous to chamfer the outer regions 83 of the arcuate surfaces 54 and 56 where they are expected to make first contact with the grooves in the pipe elements.

In another coupling segment embodiment 84, shown in FIGS. 6 and 7, the cavity 86 is divided into a plurality of sectors. In this example, there are three sectors, two end sectors 88 and 90 positioned at opposite ends of segment 84, and a middle sector 92 positioned between the end sectors. When three sectors are present, it is advantageous that each end sector subtend an angle 94 of about 45° and the middle sector subtend an angle 96 of about 90°. Other angular distributions are also feasible.

The end sectors 88 and 90 of cavity 86 are differentiated from the middle sector 92 by their angular orientation. Preferably, the end sectors 88 and 90 have respective orientation angles 98 and 100 less than about 6° and more preferably between about ¼° and about 6° while the middle sector 92 is not angularly oriented as defined herein. Preferably, the orientation angles 98 and 100 of the end sectors have the same magnitude and slope.

The coupling segments are preferably cast from ductile iron but could also be molded in plastic or machined from a metal billet. It is advantageous to impart the angular orientation of the cavity during casting of the segments rather than by machining after casting. The configuration having a plurality of sectors provides advantages in the preparation of the pattern for casting of the coupling segment. This is especially advantageous for couplings which deform to conform with the shape of the pipe elements. Because the linear motion of the segments during rotation about axis 70 is greatest at each end, it is feasible to angularly orient only the end sectors and leave the middle sector unaffected. The relatively limited traversal of the middle sector tends to have less distorting effect on the sealing member than the end sectors, which traverse the greater distance upon rotation by virtue of their greater distance from the axis of rotation.

Although the example couplings shown herein have two segments and angularly oriented surfaces to effect relative rotation of the segments, the angularly oriented cavity is applicable to prevent sealing member distortion in any style coupling wherein the segments are rotated relatively to one another out of the plane of the coupling. Further examples include couplings having 4 or more segments as well as couplings having different means for effecting relative rotation

What is claimed is:

1. A method of securing facing end portions of pipe elements together in end-to-end relationship, said method comprising:
    using a pipe coupling having a pair of coupling segments attached to one another end-to-end, said coupling segments each having a concavity extending along an inner circumference of said segments, said concavities being oriented angularly about a first axis oriented perpendicularly to a second axis extending between ends of said coupling segments, a seal being positioned within said concavities, said seal defining a plane containing said first and second axes;
    positioning said end portions of said pipe elements between said segments;
    drawing said coupling segments toward one another and said pipe elements; and
    rotating said coupling segments about said first axis relatively to said seal, thereby orienting said concavities substantially parallel to said seal.

2. The method according to claim 1, further comprising rotating said segments in opposite directions to each other.

3. The method according to claim 1, wherein positioning said end portions comprises inserting end portions of said pipe element between said segments, said segments being connected to one another end to end in spaced apart relation.

4. The method according to claim 1, wherein said drawing said coupling segments comprises tightening connection members positioned at said ends of said coupling segments.

5. The method according to claim 1, wherein said rotating said coupling segments comprises bringing angularly oriented surfaces positioned at said ends of said coupling segments into sliding contact with one another.

6. A method of securing facing end portions of pipe elements together in end-to-end relationship using a pipe coupling having a pair of coupling segments attached to one another end-to-end, said coupling segments each having a concavity extending along an inner circumference of said segments, said concavities being oriented angularly about a first axis oriented perpendicularly to a second axis extending between ends of said coupling segments, a seal being positioned within said concavities, said seal defining a plane containing said first and second axes, said method comprising:

positioning said end portions of said pipe elements between said segments;

drawing said coupling segments toward one another and said pipe elements; and rotating said coupling segments about said first axis relatively to said seal, thereby orienting said concavities substantially parallel to said seal.

7. The method according to claim 6, further comprising rotating said segments in opposite directions to each other.

8. The method according to claim 6, wherein positioning said end portions comprises inserting end portions of said pipe element between said segments, said segments being connected to one another end to end in spaced apart relation.

9. The method according to claim 6, wherein said drawing said coupling segments comprises tightening connection members positioned at said ends of said coupling segments.

10. The method according to claim 6, wherein said rotating said coupling segments comprises bringing angularly oriented surfaces positioned at said ends of said coupling segments into sliding contact with one another.

* * * * *